E. E. SMITH.
PARACHUTE.
APPLICATION FILED JULY 7, 1919.
1,354,225.
Patented Sept. 28, 1920.
3 SHEETS—SHEET 1.
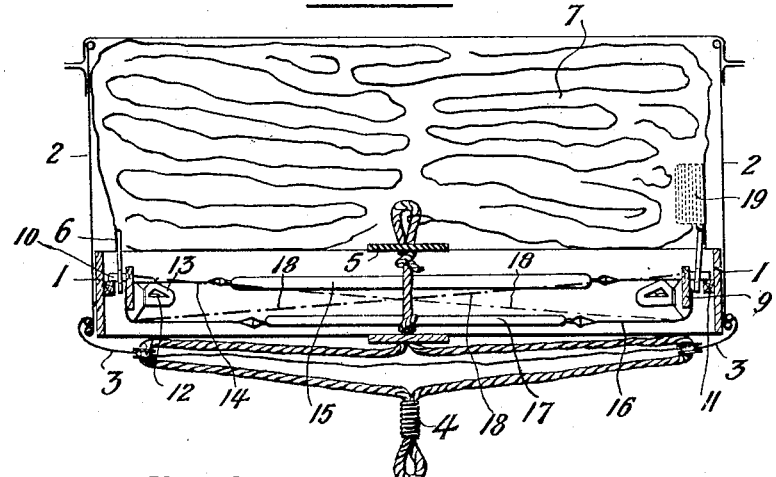
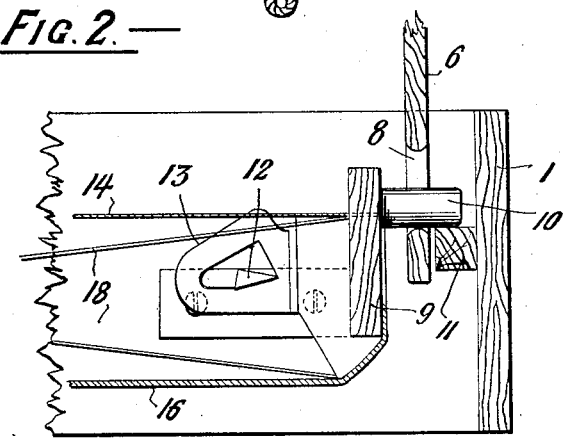
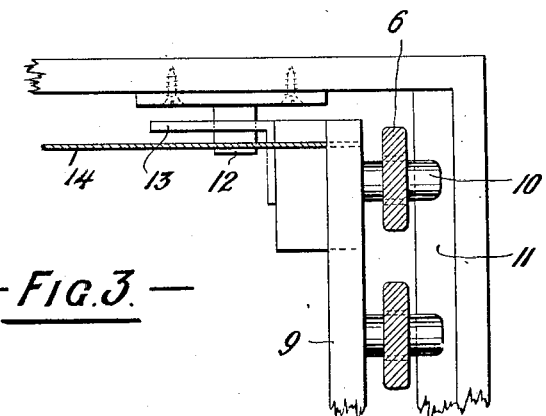

E. E. SMITH.
PARACHUTE.
APPLICATION FILED JULY 7, 1919.

1,354,225.

Patented Sept. 28, 1920.
3 SHEETS—SHEET 2.

E. E. SMITH.
PARACHUTE.
APPLICATION FILED JULY 7, 1919.
1,354,225.
Patented Sept. 28, 1920.
3 SHEETS—SHEET 3.
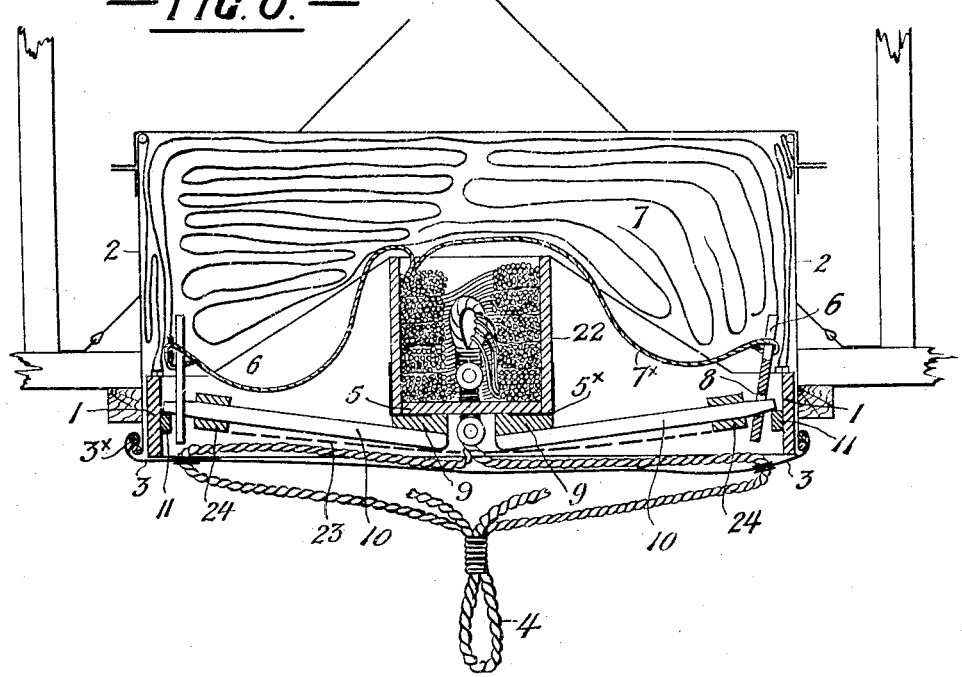
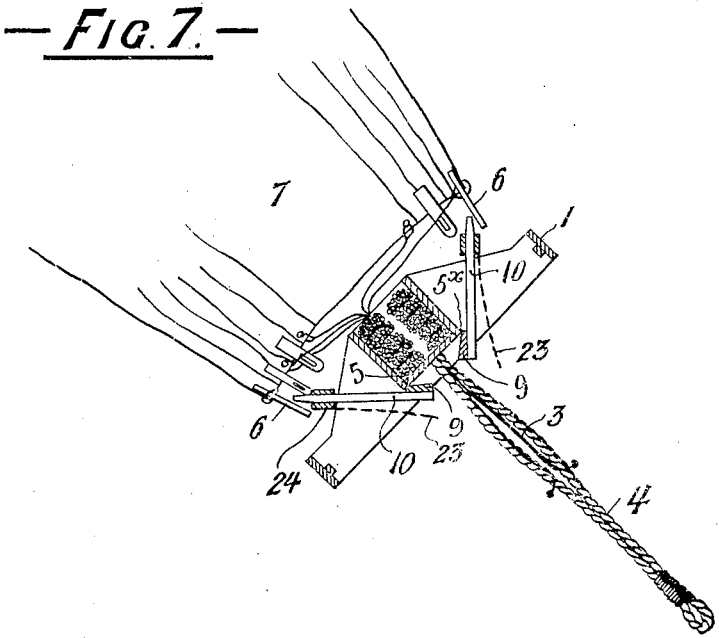

UNITED STATES PATENT OFFICE.

ERNEST EDWARD SMITH, OF CLAPHAM COMMON, LONDON, ENGLAND.

PARACHUTE.

1,354,225.

Specification of Letters Patent.   Patented Sept. 28, 1920.

Application filed July 7, 1919. Serial No. 308,979.

*To all whom it may concern:*

Be it known that I, ERNEST EDWARD SMITH, a subject of the King of Great Britain, residing at Clapham Common, in the county of London, England, have invented certain new and useful Improvements in Parachutes, of which the following is a specification.

This invention relates to improvements in or connected with parachutes particularly adapted for use with aircraft generally, the invention referring to parachute launching devices of that kind in which means are provided for the instant detachment of the whole of the parachute in bulk and a rapid fall in a partially inflated condition for a predetermined distance before permitting the parachute to fully open, so that when carried by an aeroplane even when in a spinning nose dive, there is no danger of the parachute fouling the rear planes or becoming wrapped around the fuselage, while in the case of a flaming airship or balloon there is greatly reduced risk of damage from burning debris.

The invention will be described with reference to the constructions shown on the accompanying drawings.

Figures 1 to 4 illustrate the first construction, Fig. 1 being a vertical section of the parachute in its case, Fig. 2 is a vertical section, on an enlarged scale, further illustrating the devices for retaining and releasing the edge of the parachute body, Fig. 3 being a part plan view corresponding to Fig. 2, and Fig. 4 shows the device in its release position.

Figs. 6 and 7 illustrate a second construction of the invention, Fig. 6 being a vertical section, and Fig. 7 being a similar section showing the device in its release position.

Fig. 8 is a side elevation, and Fig. 9 a front sectional elevation, showing a construction of automatic spring release device hereafter dealt with.

Figure 5:
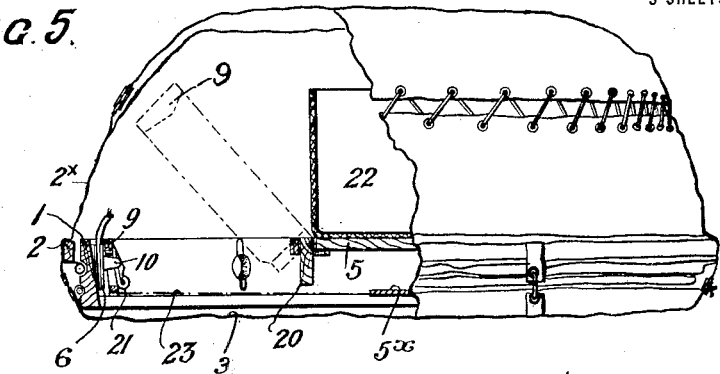
Fig. 5 is a sectional elevation showing a modified construction of the invention shown at Figs. 1 to 4.

According to the first construction of this invention as illustrated at Figs. 1 to 4, I provide a rigid open frame 1 which may be rectangular and may be constructed for instance of wood, and which frame 1 is contained in an open-bottom case 2 which may be secured in any convenient position to the aircraft; thus when applied to an aeroplane flying machine the case may be provided with battens secured on the underside of the lower longerons of the fuselage by hook-bolts so that attachment can be made without any structural alteration to the aeroplane. The frame 1 is retained within the case 2 by a detachable base cover 3 which may be of fabric and has its edges secured in such manner to the lower edges of the case and said base cover is also connected to the main suspension rope 4, so that upon receiving the load the base cover 3 is pulled off the case 2, the main suspension rope 4 passing through the base cover and being fixed to the frame 1 through the medium of cross bars 5.

The ends of the rigging cords which are connected to the main suspension rope 4 above the detachable frame 1, extend to the edges of the parachute body and are connected thereto in the usual manner, being wound or coiled to prevent entanglement in the manner hereinafter described.

The detachable frame 1 carries devices forming part of this invention, hereafter described, which engage a number of arms 6 fixed to the edges of the main body of the parachute, hereafter termed the body, and which arms 6 (which I shall hereafter term spools) are to be simultaneously released at the proper period.

The spools 6 are fixed at required distances apart around the edge of the body 7 of the parachute, each spool 6 consisting of a bar of any suitable material, one end of which projects beyond the edge of the body 7 and is formed with a hole 8, Fig. 2, while the rigging cords are connected in the usual manner to the edge of the body 7 in any approved positions thereon relatively to the spools 6.

Figure 4:
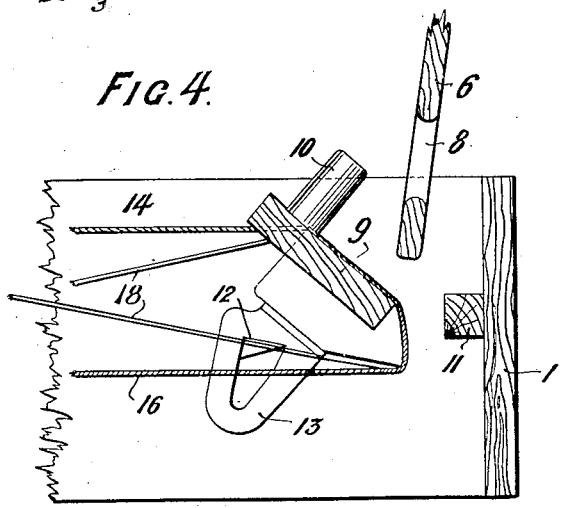

Located within the detachable frame 1 upon opposite sides of the same and parallel to each other, are two rocking bars 9 similar in all respects, and it will be therefore sufficient to describe one such bar and its connections as shown at Figs. 2, 3 and 4. From the outer face of the bar 9 a number of pins 10 project, the ends of which pins 10 normally seat themselves upon a ledge 11 or the like on the side of the detachable frame 1 adjacent to the outer face of the bar 9. The bar is fashioned with a block at each end, the inner face of which is provided with suitable antifriction bearings such as knife edges 12 extending from the ends of the frame 1 engaging loop members 13 extending from and at right angles to the bar 9.

The bar 9 on one side of the frame 1 is connected to the corresponding bar on the other side by a connection 14, Figs. 1 and 2, in which a tension spring 15 is inserted, the connection 14 being above the knife-edged bearing 12, and below the said knife-edged bearing a second flexible connection 16 extends from the bar 9 on one side to the bar 9 on the other side, the connection 16 also having inserted in its length a tension spring 17, but the lower connection 16 is at a greater distance below the knife-edged bearing 12 than the connection 14 is above it.

Beyond this the lower part of each bar 9 is connected to an upper part of an opposite bar 9 by a non-extensible connection 18 which insures that when one bar turns about its knife edge in one direction, the opposite bar will turn about its knife edge in the opposite direction.

If therefore the eyes or holes 8 of the spools 6 aforesaid are placed over the pins 10 of the bars 9 they will be retained thereon until a sufficient force is exerted by the pull of the partially inflated body relatively to the load, because to cause the bars 9 to be turned about the bearings 12 into a release position, it will be necessary to extend the spring connection 17 connecting the lower parts of the opposite bars 9 and which spring has the greater leverage.

Moreover upon the parachute offering sufficient resistance to descent and thereby automatically applying sufficient force to rock the bars 9 about their centers and cause the pins 10 retaining the spools 6 to assume a release position as at Fig. 4, the construction insures that all the spools 6 carried upon the pins 10 of both the bars 9 will be released simultaneously because the cross connections 18 between the bars synchronizes the rocking movement of the opposite parts and thereby synchronizes the release of all the spools 6.

Prior to fitting the spools 6 on to the pins 10 each spool is revolved by hand so as to wind upon itself a portion of the edge of the parachute body so as to contract its mouth, and which will immediately become unwound from the spool as soon as the latter is released from the pins 10.

Referring to the arrangement of the rigging cords, a pocket 19, Fig. 1, is provided on the parachute body near the edge of same to receive each rigging cord, and prior to insertion into its pocket, each rigging cord is coiled say on a temporary mandrel in opposite directions, that is firstly wound clockwise for a desired length, and then counter-clockwise, and so on, and so coiled each rigging cord is placed in its pocket and the temporary mandrel withdrawn; when the rigging cords are withdrawn from the pockets they will be so drawn from the center of the coils in a similar manner for instance as twine is withdrawn from the interior of a ball, and each rigging cord having its own separate pocket, entanglement of the cords becomes impossible. Moreover the cords can be so wound quickly and placed in their pockets, and the setting of the parachute for action thereby considerably facilitated It will now be understood that upon the load being brought to bear, the lower base cover 3 will be drawn off the case 2, and the frame 1 drawn therefrom, the mouth of the body of the parachute being held partially open by the retaining devices of the frame, and upon the parachute offering sufficient resistance to descent under the action of the load, the pin-carrying bars 9 will be simultaneously rocked against the action of the spring-retaining devices, and all the spools 6 will be released from the pins 10 at the same moment and the parachute body will be free to expand as is well understood.

Fig. 5 as aforesaid shows a modified construction in which the pins 10 are fixed to the spools 6 and enter holes in the rocking bars 9, and in this construction the rocking bars 9, each of which may be curved or segmental, have their ends fixed to a bar 20 which latter is hinged to a cross member 5 on the open rigid frame 1. The rocking bar 9 can be turned on its hinges into the position shown by dotted lines, and the pins 10 can be inserted through the holes in the rocking bar and temporarily secured by pins such as 21 which will be removed when the rocking bars have been placed in the position shown in full lines, and thus so long as the bars 9 are in the position shown in full lines the spools and consequently the edge of the body of the parachute will be retained as previously described.

In this construction the open-bottomed case is represented by a ring or frame 2 to which is secured a two-part fabric cover $2^x$. The lower part of the open frame 1 is closed by a flexible base cover 3 which will be pulled away, as previously described when the parachute is brought into operation, and the open frame 1 is detachably fixed to the ring 2, also by an elastic band or by any other convenient detachable means. 22 is a basket or case for containing the parachute cords.

The rocking bars 9 are held in their retaining positions as in full lines by a band 23 or the like of any suitable material, one end of which is secured to the bar on one side, and the other end of the band is secured to the bar on the opposite side of the structure, the band passing under a cross bar $5^x$, and the band is such that it will fracture at a known tension, so that when the parachute offers sufficient resistance to descent the band 23 will be broken, the bars 9 will simultaneously assume the dotted position indicated, and all the spools will be simultaneously released.

When the bar 9 is curved as previously mentioned, the pins 10, in order to insure their leaving all the holes in the bar 9, are formed conical or tapered after the manner shown at Fig. 5, the length of each pin 10 being not greater than the diameter of the hole in the bar 9, and practical experience has proved that the pins so formed leave the bar with the desired certainty.

Referring to the construction shown at Figs. 6 and 7, a rigid open frame 1 which may be rectangular and of wood and may be considered as located in a horizontal position (for the purpose of this specification) is carried loosely or freely in an open-bottomed case 2, and the said open frame 1 is retained in the case 2 by a base cover 3 which may be composed of fabric, which base cover 3 has its edge secured by an elastic or other cord 3× passing around or above an exterior projecting bead or edge on the case 2 so that the base cover 3 can be pulled away from the outer case 2.

The outer case 2 is carried in any convenient manner by the structure of the aircraft.

Extending diametrically across the open frame 1, and fixed thereto, is a plate 5, and hinged by fabric or other hinges at 5× and beneath the plate 5 are two bars 9, the upper faces of the bars contacting with the under face of the plate 5 and the hinge of each bar 9 being situated at the lower edge of the plate 5 at 5× as aforesaid, and the bars 9 are of such width that when turned into contact with the under face of the plate 5 a space exists between the adjacent edges of the bars.

The parts carried by one bar 9, and the members with which those parts coact, correspond to the parts carried by the opposite bar 9 and consequently it will be sufficient to describe the parts relating to one bar.

Assuming the bar 9 to be turned against the under surface of the transverse plate 5, a number of arms or pins 10 (hereafter termed pins) at suitable distances apart are fixed to the bar 9 and extend to the inner face of the open frame 1 where the ends of the pins 10 rest upon a ledge 11. The pins 10 are tapered, being reduced in sectional area from the bar 9 toward the open frame 1.

The parachute body 7 has fixed to its edge, at suitable distances apart, a number of spools 6 each formed with a hole 8 near its end as before described, while rigging cords 7× are also connected in the usual manner to the edge of the parachute body.

The rigging cords 7× are suitably folded or coiled and may be contained in a basket or the like 22 carried upon the top of the transverse plate 5 of the open frame 1.

The spools can be revolved by hand so as to wind upon each spool a portion of the edge of the parachute body, and by the hole in its end each spool can then be threaded over one of the pins proceeding from the hinged bar, so that each pin may have threaded upon its end one or more spools.

Obviously the spools 6 are threaded on to the pins 10 when the latter are raised into an angular position, with their ends above the upper edge of the open frame 1; and when the pins 10 are turned down as shown until their outer ends rest on the ledge 11 within the open frame 1, the spools 6 cannot leave the pins 10 until the latter are again brought to an upward angular or release position.

The main suspension rope or ropes 4 pass from beneath, through the fabric base cover 3 near the edges thereof (to which they are secured), extend above the base cover 3, and then pass centrally upward through holes in the transverse plate 5 where the main suspension rope 4 is formed into a loop or loops to which the rigging cords 7× in the basket or other container 22 are secured.

A bar 24 extends across the pins 10 near the outer ends thereof and is conveniently made so that it can be adjusted and clamped in a desired position on the pins 10, its normal position, when clamped, being adjacent to the outer ends of the pins as shown; the clamping may be effected by means of thumb screws.

The clamping bar 24 upon one set of pins is connected to the clamping bar upon the opposite set of pins by means of a breaking band or cord 23 of any suitable material, which normally holds the pins upon opposite sides in the position shown at Fig. 6, holding the spools 6 connected to the edge of the parachute body; when the apparatus is brought into use and the resistance of the parachute is sufficient to subject the cord 23 to a predetermined tensional strain, the cord will be broken, and the pins 10 will be permitted to turn about the hinges of the bars 9 into the position shown at Fig. 7, so that the spools 6 which retain the edge of the parachute will be simultaneously released and the parachute permitted to expand as is well understood.

Figure 8:
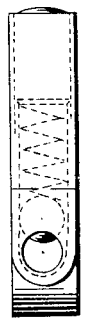
Figure 9:
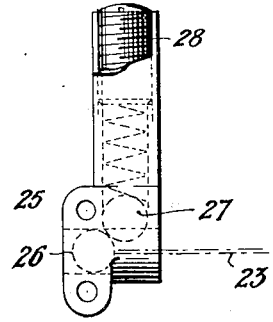

Instead of employing a cord or band 23 so fashioned or constructed that it will break at a predetermined tension to simultaneously release the groups of pins which it normally holds in their retaining positions, the cord 23 may be made of sufficient strength as not to be calculated to be broken by the strain to which it is subjected but instead the end or ends of the cord may be fixed to the pins or their carrying members by retaining devices which can be mechanically adjusted so as to release the end or ends of the cord 23 when the latter is subjected to the predetermined tension. Such a retaining device is shown at Figs. 8 and 9, consisting of a bracket through the head 25 of which a hole is formed to permit of the passage of a ball 26 fixed on the end of the cord 23. The bracket has a tubular bore at right angles to the boring containing the ball 26, and this bore contains a spherical headed plunger, or it may be a ball 27 as shown, which partly enters the bore containing the ball 26 and is pressed thereinto by a spring as indicated, the tension of which can be adjusted by the screw 28.

With such an apparatus it will be observed that the cord 23, when subjected to sufficient tension will cause the ball 26 to act against the ball 27 with sufficient force to press the latter back in its bore until the ball 26 can pass freely away, when the respective sets of pins 10 will be permitted to turn about the common axis of each set and simultaneously release the edge of the parachute.

What I claim as my invention and desire to secure by Letters Patent is:—

1. In a parachute launching device having an open bottomed case and means for fixing said case to the aircraft; the combination with a rigid open frame located within said case and adapted to be withdrawn through the open bottom thereof, a base cover secured to the lower edges of said case and adapted to retain said rigid open frame within said case, a main suspension rope passing through said base cover and fixed at one end to said open frame and means at the other end of said main suspension rope for the attachment of the load, a connection between said cover and said rope to cause the detachment of said cover and withdrawal of said frame upon the application of said load, a parachute body located within the case above said open frame, rigging cords attached to said parachute body and connected to said main suspension rope, and spools fixed to the edge of said parachute body; of oppositely located members within and hinged to said open frame, pins to engage said spools with said hinged members when the latter are substantially in the plane of said open frame, and means for holding said oppositely located hinged members in said position to retain said spools and to permit said hinged members to turn about their hinges and simultaneously release all said spools upon the parachute offering sufficient resistance to descent.

2. In a parachute launching device having an open bottomed case and means for fixing said case to the aircraft; the combination with a rigid open frame located within said case and adapted to be withdrawn through the open bottom thereof, a base cover secured to the lower edges of said case and adapted to retain said rigid open frame within said case, a main suspension rope passing through said base cover and fixed at one end of said main suspension rope for the attachment of the load, a connection between said cover and said rope to cause the detachment of said cover and withdrawal of said frame upon application of said load, a parachute body located within said case above said open frame, rigging cords attached to said parachute body and connected to said main suspension rope, and spools fixed to the edge of said parachute body; of two oppositely located members each extending diametrically across and within said open frame and adjacent to the opposite sides thereof, hinges to connect said members to said open frame to permit said members movement about parallel axes extending diametrically across said open frame, pins to engage said spools with said hinged members when the latter are substantially in the plane of said open frame, and means for holding said oppositely located hinged members in said position to retain said spools and to permit said hinged members to turn about their hinges and simultaneously release all said spools upon the parachute offering sufficient resistance to descent.

3. In a parachute launching device having an open bottomed case and means for fixing said case to the aircraft; the combination with a rigid open frame located within said case and adapted to be withdrawn through the open bottom thereof, a base cover secured to the lower edges of said case and adapted to retain said rigid open frame within said case, a main suspension rope passing through said base cover and fixed at one end to said open frame and means at the other end of said main suspension rope for the attachment of the load, a connection between said cover and said rope to cause the detachment of said cover and withdrawal of said frame upon application of said load, a parachute body located within said case above said open frame, rigging cords attached to said parachute body and connected to said main suspension rope, and spools fixed to the edge of said parachute body; of two oppositely located members each extending diametrically across and within said open frame and adjacent to the opposite sides thereof, hinges to connect said members to said open frame to permit said members to turn in the direction of the parachute, means on said open frame to prevent said hinged members turning in an opposite direction toward the load, pins to engage said spools with said hinged members when the latter are substantially in the plane of said open frame, and a tension member connected at one end to one hinged member extending beneath said members and connected to the opposite member to prevent said members turning on their hinges in the direction of the parachute and adapted to free said members to simultaneously release said spools upon the parachute offering sufficient resistance to descent and thereby increasing the tension of said tension member.

4. In a parachute launching device having an open bottomed case and means for fixing said case to the aircraft; the combination with a rigid open frame located within said case and adapted to be withdrawn through the open bottom thereof, a base cover secured to the lower edges of said case and adapted to retain said rigid open frame within said case, a main suspension rope passing through said base cover and fixed at one end to said open frame and means at the other end of said main suspension rope for the attachment of the load, a connection between said cover and said rope to cause the detachment of said cover and withdrawal of said frame upon application of said load, a parachute body located within said case above said open frame, rigging cords attached to said parachute body and connected to said main suspension rope, and spools fixed to the edge of said parachute body; of two oppositely located members each extending diametrically across and within said open frame and adjacent to the opposite sides thereof, hinges to connect said members to said open frame to permit said members to turn in the direction of the parachute, means on said open frame to prevent said hinged members turning in an opposite direction toward the load, pins to engage said spools with said hinged members when the latter are substantially in the plane of said open frame, and a tension member adapted to break at a predetermined degree of tension connected at one end to one hinged member extending beneath said members and connected to the opposite member to prevent said members turning on their hinges in the direction of the parachute and adapted to free said members to simultaneously release said spools upon the parachute offering sufficient resistance to descent and thereby increasing the tension of said tension member.

In witness whereof I have hereunto set my hand in the presence of two witnesses.

ERNEST EDWARD SMITH.

Witnesses:
   THOMAS W. ROGERS,
   WILLIAM A. MARSHALL.